United States Patent [19]

Bollian

[11] 4,446,618

[45] May 8, 1984

[54] PROCESS FOR THE PRODUCTION OF BI-METALLIC CONTACT RIVETS

[75] Inventor: Erwin Bollian, Rastatt, Fed. Rep. of Germany

[73] Assignee: Dr. Eugen Durrwachter Doduco KG, Pforzheim, Fed. Rep. of Germany

[21] Appl. No.: 362,085

[22] Filed: Mar. 26, 1982

[30] Foreign Application Priority Data

Mar. 28, 1981 [DE] Fed. Rep. of Germany ....... 3112453

[51] Int. Cl.³ ........................ H01R 43/04; B21K 1/62; B23K 20/02

[52] U.S. Cl. ........................................ 29/882; 10/27 R; 228/115

[58] Field of Search ................. 10/27 R; 29/874, 876, 29/877, 881, 882; 228/3.1, 115, 116

[56] References Cited

U.S. PATENT DOCUMENTS

| | | | |
|---|---|---|---|
| 3,371,414 | 3/1968 | Gwyn | 10/27 R X |
| 4,073,425 | 2/1978 | Bollian | 228/3.1 X |
| 4,232,812 | 11/1980 | Shibata | 228/3.1 |
| 4,373,369 | 2/1983 | Schey | 72/354 X |

*Primary Examiner*—E. Michael Combs

*Attorney, Agent, or Firm*—Balogh, Osann, Kramer, Dvorak, Genova & Traub

[57] ABSTRACT

A process for the production of bi-metallic contact rivets with especially thin precious metal layers. The process includes the insertion of two wire segments of congruous diameter but of different length and different composition into a guide bush which fits these; arranging the wire segments between an ejector pin displaceable lengthwise in the guide bush, and an abutment with a cross-sectional surface which is larger than the cross-sectional surfaces of the wire segments, which abutment is arranged coaxially to the ejector pin outside the guide bush and initially abutting the adjacent one end surface of the guide bush; while pushing forward the ejector pin in the guide bush, the abutment is simultaneously withdrawn away from the guide bush, the velocity of the abutment being smaller than that of the ejector pin; thereby upsetting the wire segments in accordance with the decreasing distance between the adjacent surfaces of the ejector pin and of the abutment, and forming a blank of a cylindrical shape; the contact rivet head is formed by cold press-working at that end of the blank where the short wire segment is found; the rest of the blank serving as the rivet shaft.

5 Claims, 9 Drawing Figures

PROCESS FOR THE PRODUCTION OF BI-METALLIC CONTACT RIVETS

BACKGROUND AND FIELD OF THE INVENTION

Figure 1:
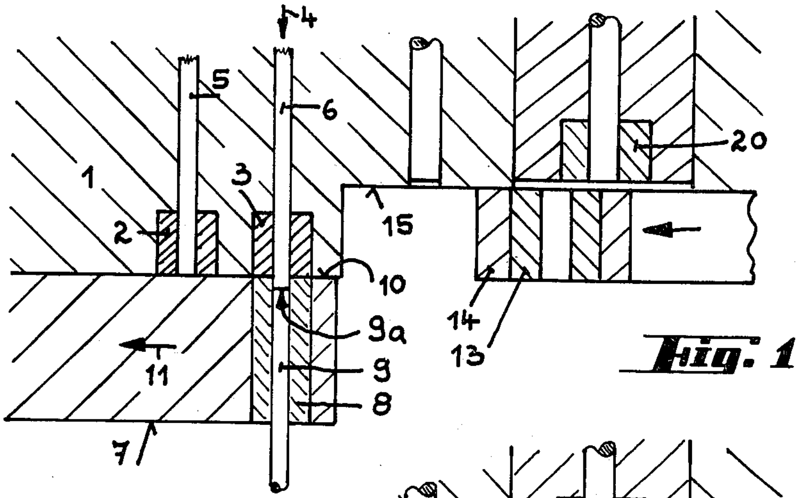

The present invention relates to a process for the production of bi-metallic contact rivets, with an extra-thin precious metal layer, through cold pressure welding operation. Such a process is known in the pertaining art (for example, from CH-PS No. 386 212, both the execution examples according to FIGS. 8–14 and according to FIGS. 15–21.) In the execution of the known process, two unequally long and differently composed wire segments with congruent cross sections are separated, arranged behind one another in a guide bush, and cold pressure welded against one another through pressure and the enlargement of striking surfaces, on the cutting surfaces which lie against one another. Thereby, the enlargement of striking surfaces will be used at the same time for the formation of the rivet head, so that the abutment—against which the wire segments are pushed out from the guide bush by an ejector pin—already occupies the contour of the rivet head, which serves at the same time as the header, so that the rivet head is formed by the upsetting of the wire segments between the ejector pin and the abutment at the same time, so that only a half-completed slug is fashioned first of all by cold press operation; the head of this slug receives its final form, in a second deformation step, through a special header. Usually, the longer wire segment consists of copper and the shorter one of silver. The copper is inserted for the formation of the rivet shaft as well as for the formation of part of the rivet head which is further back; the costly silver, on the other hand, is only inserted for the formation of the contact layer proper.

In comparison with contact rivets of solid silver, bi-metallic rivets with a copper shaft and with contact surfaces of silver bring about a considerable saving of silver. The on-going cost increases of precious metals has brought it about that one is now most concerned to further reduce the precious metal insertion in bi-metallic rivets. So, for example, it has been proposed to insert the precious metal in the center of the contact surfaces only; however, such kinds of bi-metalllic contact rivets are, on the one hand, relatively expensive to produce, and on the other hand they only bring about an apparent savings of precious metal, since a contact surface requires a certain minimum size for any given purpose of insertion. A substitute of precious metal in the border area by base metal would unacceptably affect the switch behaviour.

One is thus concerned to keep the precious metal layers on the bi-metallic contact rivets as thin as possible. As long as one starts with plated, cord-like material in the production of bi-metallic contact rivets, then it is no problem to keep the layer of precious metal agreeably thin. However, the production of bi-metallic contact rivets from cord-like material is so expensive, that such rivets are much more expensive than rivets which are produced through the cold pressure welding from wire. In the last mentioned process, however, the precious metal layer can not be made suitably thin. The reason lies in this, that it is possible to cut off and handle suitably short wire segments. According to experience, one needs in a silver wire with the diameter D a minimum length of the wire segments of approximately 0.5D to 0.8D, where the lower value 0.5D is valid for very thick wires, and the higher value 0.8 D for very thin.

At the base of the present invention lies the task of making available a process suited for mass production which permits bi-metallic contact rivets, with thinner precious metal layers than previously, to be produced by means of cold pressure welding operations.

SUMMARY OF THE INVENTION

The present invention resolves the aformentioned problem in the art by providing for a process for producing a bi-metallic contact rivet, having a suitably thin precious metal layer, by means of cold pressure welding operations.

The process includes inserting two wire segments of different composition and length but of congruous diameter into a guide bush which fits the two wire segments (The wire segments have a smaller diameter than that of the contact rivet shaft to be produced.); arranging of the two wire segments, which frontally impinge on one another, between a movable ejector pin, which is displaceable lengthwise in the guide bush, and a movable abutment having a cross-sectional surface larger than the cross-sectional surfaces of the wire segments, and which is arranged coaxially to the ejector pin outside of and adjacent to the guide bush and initially abutting one adjacent end surface of the guide bush; pushing forward the ejector pin in the guide bush and simultaneously withdrawing the abutment from the guide bush coaxially with the forward movement of the ejector pin; the velocity of the abutment relative to the guide bush being smaller than the velocity of the ejector pin relative to the guide bush, and both velocities standing in constant relationship one to another; thereby upsetting the wire segments in accordance with decreasing distance between the approaching surfaces of the ejector pin and of the abutment, and forming a slug or blank therefrom of cylindrical shape and having the diameter of the contact rivet shaft being produced; and forming the contact rivet head by cold pressworking at that end of the blank constituting one of the two wire segments forming the blank, the one having a smaller length dimension or being short as compared with the other. An essential characteristic of the invention is that first of all, a cylindrical slug with increased diameter is produced by cold pressure welding operation from the two wire segments, and the rivet head is formed there afterwards at that end of the slug where the precious metal is found, through the reshaping of the slug. In view of given dimensions of the finished contact rivet, the invention, because of the formation of the slug with increased diameter, starts from thinner and correspondingly longer wire segments than the processes already known from the art. Known methods start from wires which already have the diameter that the shaft of the finished contact rivet will possess. Since the invention starts from thinner wires, the volume portion of the inserted precious metal of each contact rivet can be reduced. To be sure, as was mentioned, suitably short wire pieces can not be cut off; however, if this can be selected thinner than previously, with consistent lengths of precious metal-containing wire segments, then the savings of precious metal follows from the diminution of cross section. One obtains the greater shaft diameter of the bi-metallic contact rivet required through the upsetting of the wire segments, by which these are cold pressure welded together at the same time. The length of the wire segments is shortened by upsetting to the same extent that the cross section of the wires is increased. The length of the precious metal segment of the slug formed by upsetting, and hence the thickness of the precious metal layer on the completely formed contact rivet head, can thus be smaller than would be possible, if one were to start on the production of a bi-metallic contact rivet with the same exterior dimensions of the wire segments, which already correspond in diameter with the diameter of the shaft of the bi-metallic contact rivet. The enlargement of diameter which occurs in upsetting may be so selected, that a flawless cold pressure welding is guaranteed. For the metal coupling of Copper/Silver, one purposely chooses for this purpose the velocity relationships of abutment to ejector pin given in claim 3. In a value of $v_w/v_s<0.25$, only a progressively inadequate cold pressure welding, takes place in the outer area of the impact surfaces of the wire segments, while in a value of $v_x/v_s$ above 0.5, the increase of cross section is too slight for a flawless cold pressure welding.

At the beginning of the upsetting process, the abutment lies adjacent to the end of the guide bush. Between the abutment and the ejector pin, which projects out from the other end into the guide bush, there are found both wire segments which lie adjacent with their ends turned towards one another, and which lie adjacent to the ejector pin with the outer ends on the abutment. Subsequently, the ejector pin is thrust forward, inside the guide bush, and simultaneously therewith, the abutment moves back from the box with the lesser velocity of $v_w$. In the interior of the guide bush, an upsetting can not take place, since the wall of the guide bush opposes an enlargement of the cross section of the wire segments. The upsetting occurs, rather, in the space between the end of the guide bush and the abutment, which is turned towards this end. The increase of diameter occurs continually along the wire segments, continuing during the thrusting of the wire segments out of the guide bush. The increase of cross section takes place according to the equation, $$F_1 v_s = F_2 v_w, \qquad \text{(I)}$$

in which $F_1$ signifies the cross section surface of the wire segment before the upsetting and $F_2$ the same after the upsetting. It is therefore fundamentally unimportant, whether the ejector pin is moved against the abutment, or the abutment against the ejector pin. What is important is that during the upsetting, a space is available outside the guide bush, in which the enlargement of cross section which occurs during upsetting can take place.

During the upsetting, the upsetted segments of the wires requires fundamentally no lateral control. Preferably, however, a wider guide bush can be used, the thinner cross section of which is just $F_2$ or a trifling bit lower. In this second guide bush, the abutment is displacably located. The second guide bush can further be used in an advantageous way to hold the slug, while this is transferred to a header implement, as well as during the head forming process itself.

The forming of the rivet head on the slug can take place, in the known process, through one or two deformation blows. By carrying out two deformation blows, the end of the slug covered with precious metal which remains in a bush is next pre-upsetted as well in the free space of the box, so that it can no longer snap off during the second deformation blow. The second deformation blow is carried out with a press dies (header), which possesses a cavity, the contour of which is congruent with the contour of the contact rivet. If only one deformation blow is carried out, then it is carried out with the header, and the pre-upsetting slips.

As an example of possible savings of precious metals, the following numerical example is given:

From a copper wire segment of 9 mm length and 3 mm diameter, and from a silver wire segment of 2 mm length and 3 mm diameter, a bi-metallic contact rivet can be produced by a prior art cold pressure welding operation, which exhibits the following typical dimensions:

(a) Shaft diameter: 3 mm
(b) Shaft length: 3 mm
(c) Head diameter: 6 mm
(d) Head height: 1.5 mm, of which
 there consists of silver: 0.5 mm
 and of copper: 1.0 mm According to the process of the invention, a bi-metallic contact rivet with congruent dimensions can be produced from a copper wire segment of 30 mm length and 1.64 mm diameter, as well as from a silver wire segment of 1.5 mm length and 1.64 mm diameter. Through upsetting, a slug of 3 mm diameter and 9.45 mm length, of which 0.45 mm consists of silver, is discharged. After the formation of the head of 6 mm diameter, with a continuing shaft length of 3 mm, there arises on the head a layer of silver with an average thickness of only about 0.11 mm; that is to say, the silver quantity inserted amounts to only around 20%, compared with the previously described bi-metallic contact rivet made according to the prior art process. By the saving of silver, the height of the rivet head is reduced by around 0.39 mm. If necessary, this can be compensated for by an increased supply of copper.

The appended sketches (FIG. 1 to FIG. 9) show schematically an example for the completion of the process according to the invention by the depiction of the most important elements of the apparatus, which is required for the completion of the process.

In a support (1), there are found parallel to one another two cutting bushes (2 and 3) with congruently inner breadth, to which are led a copper wire (5) and a silver wire (6), from a wire supply and in the direction of the arrow (4), by means of a conveyor apparatus which is not depicted. Both wires have congruent diameters (FIG. 1). The free ends of both cutting bushes (2 and 3) lie in a straight line with an even upper surface (10) of the support (1), along which a slide (7) is displacable. The slide (7) possesses, parallel to the cutting bushes (2 and 3), a guide bush (8) which runs through it, and which has the same inner diameter, which the cutting bushes (2 and 3) exhibit. In the guide bush (8) an ejector pin (9) is displacably arranged.

The production process begins when the slide (7) is so displaced, that the guide bush (8) is in alignment with cutting bush (3) (FIG. 1); in doing so the ejector pin (9) is so positioned that its more forward end (9*a*) occupies a distance from the upper surface (10) that coincides with the length of the segment of silver wire (6*a*) which is to be cut off. The silver wire (6) is thrust forward, until it impinges on the end (9*a*) of the ejector pin, and then the slide (7) is moved in the direction of the arrow (11) (FIG. 1) so that the silver wire segment (6*a*) which is placed in the guide bush (8) is sheared off.

Figure 2:
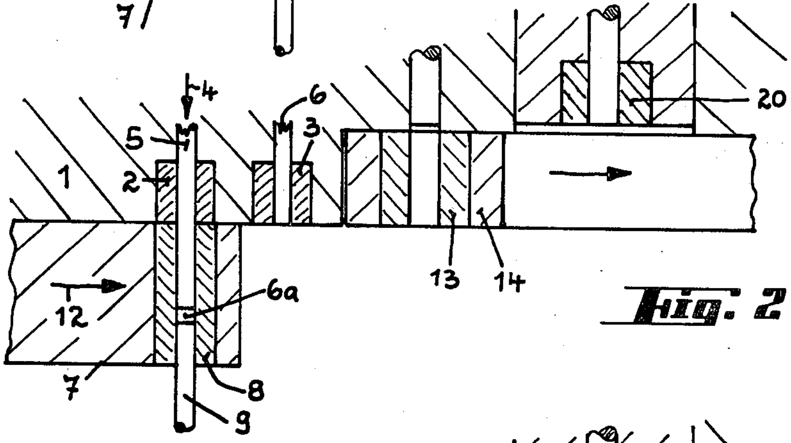

The slide (7) now proceeds until the guide bush (8) aligns with the cutting bush (2); at the same time, the ejector pin (9) is drawn back a distance which agrees with the length of the copper wire segment (*5a*) to be sheared off (FIG. 2). The copper wire (5) is thrust forward in the direction of the arrow (4), until it impinges on the silver wire segment (*6a*). Subsequently the slide (7) is moved in the direction of the arrow (12) (FIG. 2), so that the copper wire segment (*5a*) is sheared off.

Figure 3:
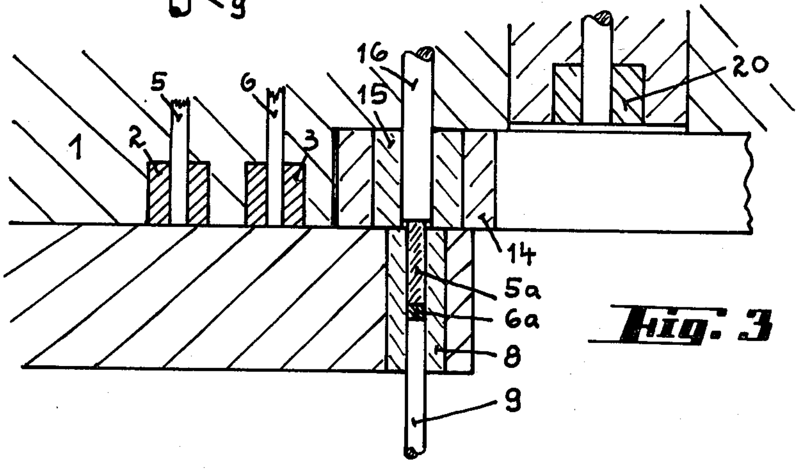
Figure 4:
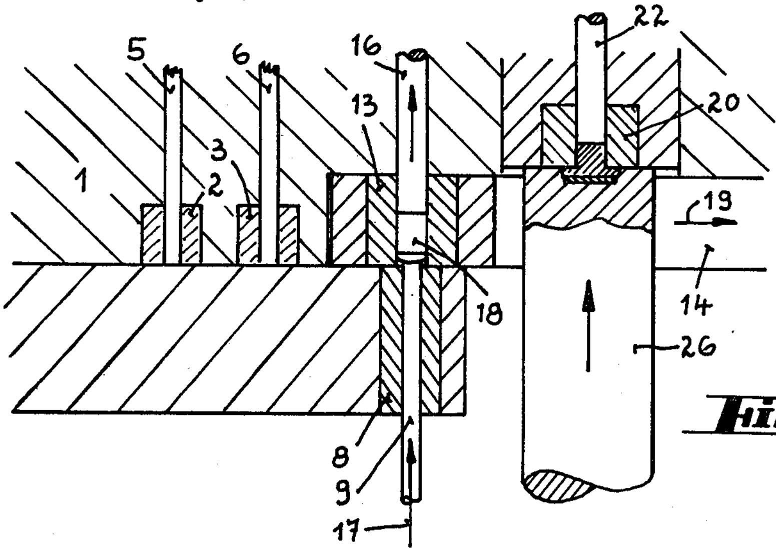
Figure 5:
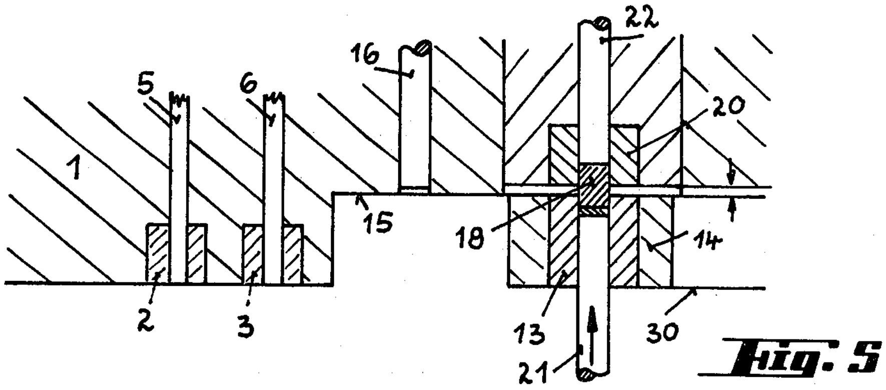

The slide (7) is now displaced, until the guide bush (9) aligns with a second guide bush (13), which arranged so as to be penetrating a second slide (14), which is parallel to the first slide (7), and is between the first slide (7) and the support (1), and is displacable in a graduated cavity (15) of the support (1) (FIG. 3). The second guide bush (13) has a thin cross section, which, for example, is larger by the factor of 3.5 than the thin cross section of the first guide bush (9). In the guide bush (13) there is a pestle (16) located in the support which is displacably conducted and has a horizontal end surface. This pestle (16) stands next to the end of the guide bush (8), so that both wire segments (*5a* and *6a*) are held free from play between the ejector pin (9) and the pestle (16). Now the ejector pin (9) is thrust in the direction of the arrow (17) into the guide bush (8), and simultaneously with this, though with a velocity diminished by the factor of 3.5, the pestle (16) is withdrawn in the direction of the arrow (17). The ejector pin (9) thus compresses the wire segments (*5a* and *6a*) against the slower pestle (16), which servers as an abutment. The result of this is that the cross section of the wire segments (*5a* and *6a*) are expanded by the factor of 3.5; the upsetting takes place with the entry of the material from the guide bush (8) into the second guide bush (13). Both the wire segments (*5a* and *6a*) are thereby cold pressure welded and form a cylindrical slug (18). As soon as the more forward end of the ejector pin (9) has reached the upper surface (10), its assistance is ended and the pestle (16) is fully withdrawn from the second guide bush (13). The slide (14) is now displaced in the direction of the arrow (19) (FIG. 4), until the guide bush (13) is aligned with an equally wide guide bush (20) in the support (1). Between two displacable pins (21 and 22 respectively), which are led into these two guide bushes (13 and 20), the slug (18) is so positioned that it projects into the guide bush (20) by a length which corresponds to the shaft length of the completed bi-metallic contact rivet (FIG. 5).

Figure 6:
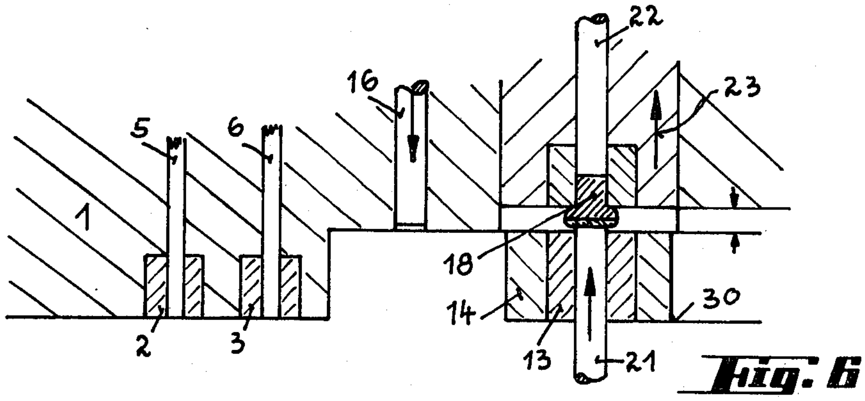

Subsequently, the guide bush (20) and the pin (22) are moved back a certain pre-selectable distance (L) in the direction of the arrow (23). Simultaneously, the pin (21) is moved in the same direction (23) (FIG. 6). In this way, there arises between the slide (14) and the guide bush (20) a free space (24), in which the rivet head is later pre-upsetted. This takes place with the help of the pin (21), through the assistance of the pin (21), which is in the direction of the arrow (23), and against the stationary pin (22) as an abutment (FIG. 6). Through the pre-upsetting of the head it so happens that, in the following reshaping process, through which the head is finally formed, the end of the slug (18) which juts out from the guide bush (20) does not break.

Figure 7:
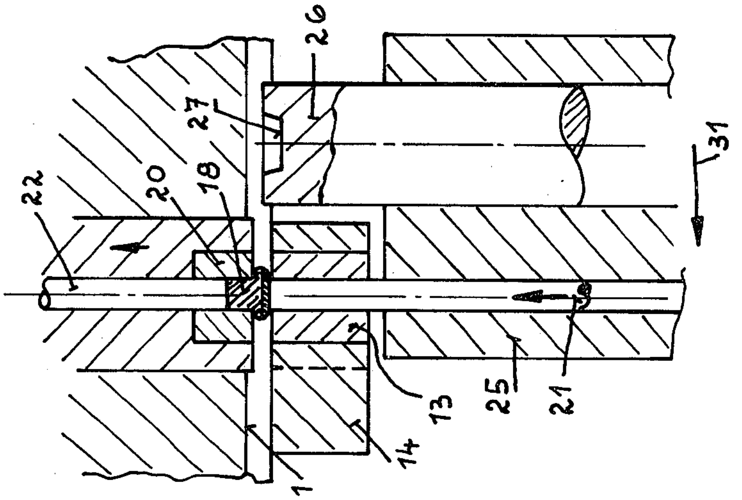
Figure 8:
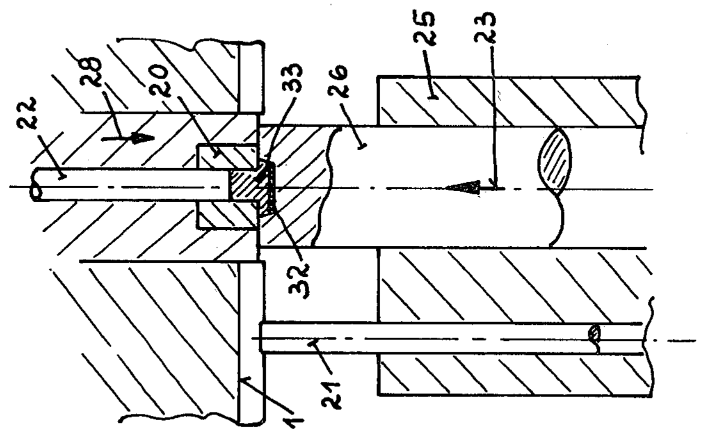
Figure 9:
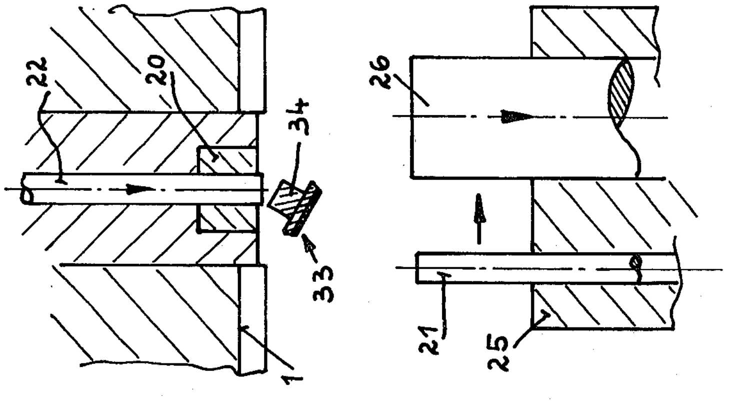

FIG. 7 shows the moment of pre-upsetting, and in a line of sight turned by about 90 degrees (direction of the arrow (29) in FIG. 6). After the pre-upsetting of the rivet head, the pre-upsetting pin (21) is withdrawn and the slide (14) is displaced in the direction of the arrow (29). Simultaneously, a tooling slide (25), which is arranged parallel to the slide (14), is displaced in the direction of the arrow (31). On the tooling slide (25) the pre-upsetting pin (21) and a pestle (26) which serves as a header are located parallel to one another. By this displacement, the header (26) and an aperture (30) which is located in the slide (14) between the header (26) and the support (1) arrive in front of the guide bush (20) with the slug (18) inside it. The header (26) has in its frontal surfaces—which are found normally at the height of the frontal surfaces of the guide bush (20), at its outlet position (FIGS. 5 and 6)—a cavity (27), which exibits the contour of the contact rivet head which is to be produced. The guide bush (20) is now moved, in common with the pin (22) which remains inside, in the direction of the arrow (28), and strikes the pre-upsetted slug (18) against the stationary header (26), so that the head (32) receives its definitive form (FIG. 8). Subsequently, the tooling slides (25) are moved in the direction of the arrow (28); it distances itself from the support (1) and takes the header (26) and pre-upsetting pin (21) with it, so that the completed bi-metallic contact rivet (33) is released. Subsequently the pin (22) is thrust forward in the direction of the arrow (28), and expels the completed bi-metallic contact rivet (33), which up until then has still been kept in its shaft (34) in the guide bush (20), out of this (FIG. 9).

In the apparatus depicted, two processing cycles can run parallel, though temporally staggered, for the increase of output. This is indicated in FIG. 4, where simultaneous with the upsetting of the wire segments (*5a* and *6a*) for the formation of a slug (18), the head is formed by the header (26) against the previously completed slug (18).

I claim:

1. A process for producing a bi-metallic contact rivet by means of a cold pressure welding operation, comprising:

inserting two wire segments of different composition and length but of congruous diameter into a first guide bush which fits the two wire segments, the diameter of the wire segments being smaller than that of the contact rivet shaft to be produced;

arranging of the two wire segments, which frontally impinge on one another, between an ejector pin displaceable lengthwise in the first guide bush, and a movable abutment having a cross-sectional surface larger than the cross-sectional surfaces of the wire segments, and arranged coaxially to the ejector pin adjacent to the first guide bush and initially abutting the adjacent end surface of the first guide bush;

pushing forward the ejector pin in the first guide bush and simultaneously withdrawing the abutment from the first guide bush coaxially with the forward movement of the ejector pin while leading the wire segments into a second guide bush in which the abutment is moveable, the relationship between the cross-sectional surfaces of the first guide bush and second guide bush being proportional to the relationship between the velocities of the ejector pin and the abutment;

maintaining the velocity of the abutment relative to the first guide bush smaller than the velocity of the ejector pin relative to the first guide bush, while maintaining both velocities in constant relationship to one another;

upsetting the wire segments in accordance with a decreasing distance between approaching surfaces of the ejector pin and of the abutment, and forming a blank therefrom of enlarged and uniform cylindrical shape and having the diameter of the shaft of the contact rivet to be produced; and forming a contact rivet head by cold press-working at that end of the blank constituting one of the two wire segments forming the blank, said one of the two wire segments being shorter than the other.

2. A process according to claim 1, wherein the pushing forward step comprises adjusting the relationship of the velocities of the ejector pin and of the abutment.

3. A process according to claim 1 or 2, wherein during the upsetting of the wire segments, increasing the cross-sectional area of the wire segments, in proportion to a predetermined ratio (Vw; Vs) of the velocities of the ejector pin (Vs) and the abutment (Vw).

4. A process according to claim 1 or 2, wherein the pushing forward step further comprises selecting the relationship of the velocities of the ejector pin (Vs) and of the abutment (Vw) by using wire segments of copper on one side, and of silver on the other side, the segments having predetermined lengths in a proportion corresponding to that of the velocities of the ejector pin and the abutment, between Vw/Vs=0.25 and Vw/Vs-0.5.

5. A process according to claim 1 or 2, wherein the pushing forward step further comprises selecting the relationship of the velocities of the ejector pin (Vs) and of the abutment (Vw) by using wire segments of copper on one side and of silver on the other side, the segments having predetermined lengths in a proportion corresponding to that of the velocities of the ejector pin and abutment, between Vw/Vs=0.3 and Vw/Vs-0.4.

* * * * *